3,490,488
ELASTIC EXHAUST CAP
George Douglas Grist, Coventry, Conn., assignor to The Jacobs Manufacturing Company, West Hartford, Conn., a corporation of New Jersey
Filed Feb. 27, 1968, Ser. No. 708,595
Int. Cl. F16k *17/02, 21/04*
U.S. Cl. 137—512.4                    7 Claims

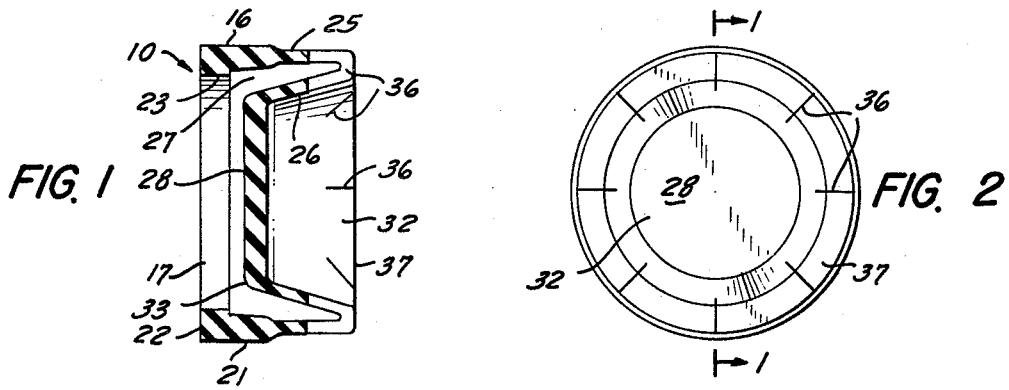
FIG. 1
FIG. 2
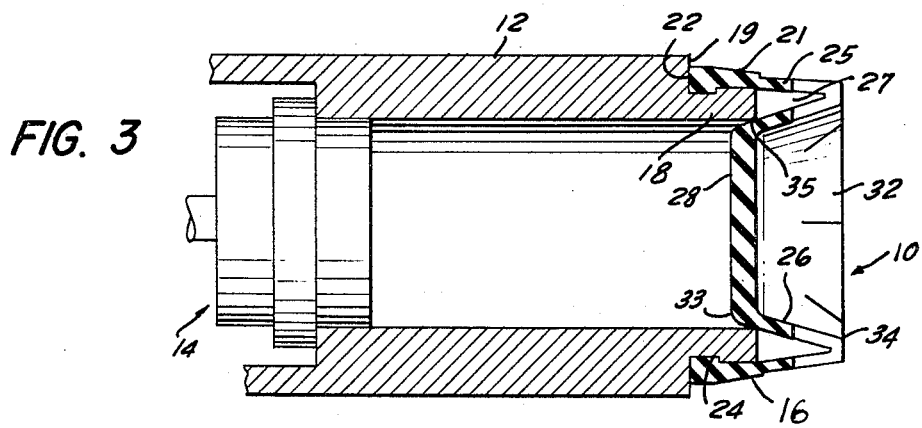
FIG. 3
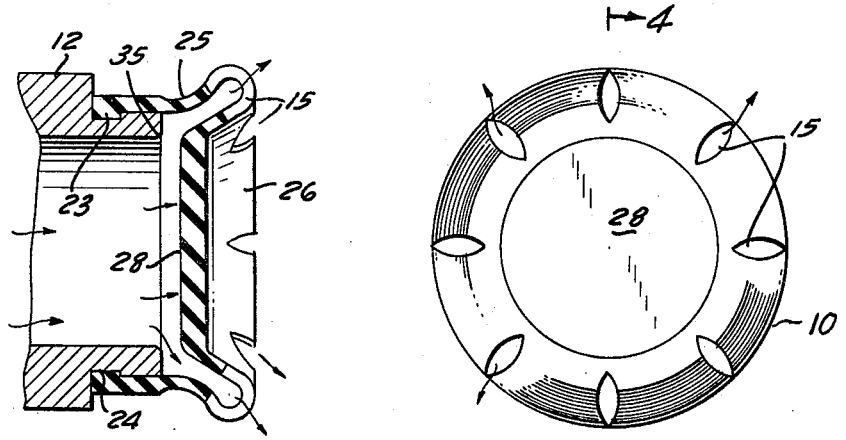
FIG. 4
FIG. 5
INVENTOR.
GEORGE D. GRIST
BY
ATTORNEY

United States Patent Office 3,490,488
Patented Jan. 20, 1970

ABSTRACT OF THE DISCLOSURE

An elastic cap is provided both as a protective cover and an exhaust outlet for the discharge end of an exhaust tube through which pressure air is caused from time to time to be discharged. When pressure air is not exhausting through the tube, a plurality of normally closed slits cut into a flexible portion of the cap prevents seepage of fluid or entry of foreign matter into the tube. The pressure of exhaust air passing through the tube causes the flexible portion to expand and dilate the slits into openings through which the exhaust air readily escapes. A stiff disc wall portion of the cap is normally positioned in the exhaust end of the tube. The stiff wall not only serves as a secondary seal for the tube but also acts as a piston under the force of exhausting air to cause expansion of the cap and the consequent dilation of the slits. As the cap expands, it cleans its outer surface of foreign matter that might have collected thereon. As an illustration of its use, the cap is described as applied to the exhaust tube of a skid control device associated with the air brake mechanism of a motor vehicle.

Background of the invention

This invention relates to the art of protective covers for the discharge end of exhaust tubes.

Various devices are provided with exhaust or pressure fluid relief tubes which must allow ready passage of the exhausting fluid when necessary; but when exhaust is not taking place it is essential that operating mechanism within the device be protected against foreign matter and moisture that might enter through the open exhaust tube. This problem is present in devices which are exposed to all weather conditions. It is particularly present in devices wherein the exhaust tube is relatively short so that easy access is provided for foreign matter into the tube to the internal operating mechanism of the device. Skid control devices associated with the air brakes of a motor vehicle and mounted to the underside of the vehicle have short exhaust tubes and are subjected to all forms of weather and road conditions.

The elastic exhaust cap of the present invention provides an effective solution to these problems and is especially suited for use with the pressure air exhaust tube of skid control devices.

The general object of the present invention is to provide a cap to cover over the discharge end of a pressure air exhaust tube which will, during the time exhaust air is not passing through the tube, effectively seal out dust and foreign matter and prevent seepage into the tube of external fluids splashed over the cap; and which will allow, when the occasion arises, free and rapid escape of exhausting pressure air from the tube.

It is also an object of the present invention to provide an exhaust cap which is adapted during escape of exhaust air to clean itself of snow, ice, dirt and other foreign matter that might have collected upon its surface.

Description of the drawing

In the accompanying drawing:

FIG. 1 is a section taken on line 1—1 of FIG. 2 of an elastic exhaust cap embodying the invention;

FIG. 2 is a right end elevational view of FIG. 1;

FIG. 3 is a sectional view illustrating the cap of FIG. 1 as applied to the pressure air exhaust tube of a motor vehicle skid control device shown in closed condition during a period when exhaust pressure air is not passing through the tube.

FIG. 4 is a sectional view taken on line 4—4 of FIG. 5 illustrating the dilated condition of the cap caused by pressure air exhausting through the tube; and FIG. 5 is a right end view of FIG. 4.

Detailed description of a preferred embodiment

In the drawing is shown an exhaust cap 10 formed of a flexible elastic material such as rubber. It is adapted to fit over the discharge end of a cylindrical exhaust tube 12. In this instance, the exhaust tube shown is a part of a skid control device associated with a wheel of a motor vehicle. When the occasion demands, a valve mechanism 14 of the control device with which the exhaust tube 12 is connected is caused to allow escape through the tube of pressurized air that had been previously applied to the air-brake mechanism of the vehicle. This tube has been made short to facilitate mounting of the skid control device in a usually crowded area at the underside of the associated vehicle. Foreign matter that might otherwise enter the short tube and possibly damage the valve mechanism or other components of the control device is sealed out by the cap 10 during the time that exhaust air is not flowing through the tube. When exhaust air is passing through the tube, the pressure of the exhausting air causes the flexible, elastic cap to expand so as to allow the air to freely escape through a group of normally closed apertures 15, as in FIGS. 4, 5.

The cap is a one-piece moulded structure having the form shown in FIG. 1. It comprises an outer cylindrical skirt portion 16 having an open front end 17 designed to fit over the discharge end of the exhaust tube 12. To receive the cap, the tube is formed with an end portion 18 of reduced outer diameter having an annular radial shoulder 19 at its back. A thickened portion 21 of the skirt wall corresponding substantially to the axial dimension of the reduced tube end 18 is intended to fit over this end until the end wall 22 of the cap abuts the tube shoulder 19. The cap is formed adjacent its open end with an internal annular squared rib 23 which is adapted to engage in a complementary annular groove 24 formed in the tube end portion 18 so as to retain the cap upon the tube against endwise escape. The inner diameter of this rib is slightly smaller than the outer diameter of the seat of the groove 24 so that the thickened end 21 of the cap must be stretched sufficiently to pass it over the end portion 18 of the tube and engage the rib in the groove. When this is done, the cap is caused to be securely retained upon the tube and prevented from being blown free of the tube by the pressure of exhausting air. The tight, elastic grip of the end of the cap over the end of the tube, and the flush engagement of the squared wall areas of the rib 23 with the corresponding wall areas of the groove 24 seals this connection fluid tight.

The thickened end portion 21 of the cap skirt 16 is designed to terminate substantially at the outer end of the tube 12, as appears in FIG. 3. The wall of the skirt beyond this end portion is reduced in thickness so as to provide a readily flexible rear portion 25. This flexible portion is continuous at its rear extremity with an inturned conical wall portion 26 of similar thickness and flexibility. The conical wall 26 extends axially forward into the interior of the skirt 16 with a surrounding clearance 27 and terminates in a truncated circular end wall or disc 28. The latter is stiff and relatively thicker than the flexible conical wall 26. The conical wall, together with the stiff wall 28, defines a plug or cork of cup-form adapted to be entered into and to seal the open discharge end of the tube 12 as indicated in FIG. 3. The stiff wall 28 extends radially to the axis of the cap 10 and is formed with parallel front and rear faces, the rear face of which defines the bottom of a truncated conical recess 32 in the rear of the cap. It is intended, when the cap is fitted to the tube 12, as shown in FIG. 3, that the end of the tube will extend in part into the clearance 27 of the cap and that the stiff wall 28 of the cap will extend into and seal the open discharge end of the tube. To allow easy entry into the tube of the stiff wall, the tapered periphery of the latter enlarges from a minor diameter 33 which is less than the inner diameter of the tube to a major diameter 34 which is greater than the inner diameter of the tube 12. Also, the axial extent of the flexible conical wall 26 is slightly longer than the corresponding flexible wall portion 25 of the skirt. By means of this structural arrangement, when the cap 10 is fitted onto the tube 12, the stiff wall 28 will extend fully into the tube and the inner diameter edge 35 of the tube will press lightly on the flexible conical wall portion 26 immediately to the rear of the stiff wall thus providing a desirable sealing or corked relation of the stiff wall 28 with the tube 12. The inner edge 35 of the tube is slightly rounded so as to present a non-biting edge to the wall 26 of the cap.

To permit the escape of exhaust air through the cap, the latter is formed with a group of slits 36 extending axially through a peripheral surface 37 formed at the junction of the skirt and conical walls 25 and 26. The slits extend equally into and substantially halfway into the flexible skirt and conical wall portions. The slits are spaced circumferentially equally apart and are radial to the axis of the cap. After the cap has been formed by a moulding process, the slits are then made with a sharp knife. In this manner no material is removed from the cap; and the resilient walls of the slits tend to resiliently press against one another in a tight normally closed condition. A still tighter seal of the slits is effected when the cap is fitted to the exhaust tube 12. In this respect, the stretched condition of the fitted end 21 of the cap upon the tube causes the slitted peripheral end 37 of the cap to slightly tip radially inwardly of the recess 32. This slight tipping compresses the flexible material about the slits 36 into a tighter sealing relation. This tightly sealed relation of the slits not only seals out fine dust and water, but is also effective to prevent any water splashed over the slits from seeping or "wicking" through into the interior of the cap. The plugged relation of the stiff wall 28 with the tube 12 acts as a secondary seal.

Accordingly it is apparent that when exhaust pressure air is not passing through the tube, the latter is efficiently sealed fluid and dust tight against the entry of contaminants into the interior of the tube.

When exhaust pressure air is caused to flow through the tube toward its discharge end, it presses across the broad inner surface provided by the stiff end wall 28 and forces the latter axially outwardly of the open end of the tube as in FIG. 4. This causes the flexible wall portions 25 and 26 to expand and dilate the walls of the slits 36. The exhausting air then escapes freely through the apertures 15 developed upon dilation of the slits as appears in FIGS. 4 and 5.

Here, the cap has been provided with eight slits 36. This number has been found in this instance to allow a rapid release of the exhausting air without development of undesirable back pressure.

When exhaust air flow to the tube is terminated, as when the valve mechanism 14 is closed, the expanded walls of the elastic cap resiliently collapse to normal condition as in FIG. 3.

Besides allowing exhaust of pressure air and sealing out foreign matter, the cap 10 is self-cleaning; that is, its action in expanding and collapsing operates to break up and scatter from its external surface any mud, snow, ice or other foreign matter that might have collected upon the cap during the period that exhaust air was not flowing through the exhaust tube 12.

What is claimed is:

1. The combination of an elastic cap with an externally located pressure air exhaust tube of an anti-skid control unit of a motor vehicle, wherein the cap comprises an outer cylindrical skirt section having an open forward end, a thickened part extending rearwardly from the forward end for a predetermined distance, and a flexible thinner part continuing rearwardly from the thickened part; a cup-form section disposed coaxially within the interior of the skirt having a forward stiff disc normal to the axis of the skirt and a coned flexible wall the minor diameter end of which is merged in the periphery of the disc and the major diameter of which has an outturned continuous connection with the rear extremity of the flexible part of the skirt; and a plurality of slits formed axially forward through the connection part-way into both the flexible part of the skirt and the coned wall, the slits having a fluid-tight normal condition, the open end of the skirt being engaged over the discharge end of the exhaust tube to the extent of the thickened part, the disc being positioned rearwardly of the open end of the skirt and having a normal plugged relation with the discharge end of the exhaust tube, the disc adapted under pressure of exhaust air applied to it through the tube to move axially rearward relative to the skirt, and the flexible part of the skirt and the coned wall adapted to expand upon such movement of the disc so as to cause dilation of the slits to open condition allowing exhaust of pressure air from the tube; and the disc and the flexible part of the skirt and the coned wall adapted upon discontinuance of the exhaust of pressure air to resiliently return to normal condition.

2. An elastic cap as in claim 1, wherein the open end of the cap is of smaller diameter than the outer diameter of the discharge end of the tube upon which it is adapted to be engaged, and the thickened part is stretchable so as to tightly engage over said discharge end.

3. An elastic cap as in claim 1, wherein means is provided adapted to retain the cap upon an exhaust tube against endwise escape.

4. An elastic cap as in claim 3, wherein the means is an integral internal rib adjacent the open end of the cap adapted for engagement in a peripheral groove provided on the tube.

5. An elastic cap as in claim 2, wherein the rear extremity of the skirt is adapted upon application of stretching of the open end of the cap to tip radially inward and cause the opposed walls of the slits to compressively engage upon one another in a fluid-tight sealing relation.

6. In apparatus including an externally located exhaust tube through which pressure air is caused at times to be discharged, a separable one-way flow cap over the discharge end of the tube, the cap comprising a one-piece elastic body having an outer cylindrical skirt with an open forward end in which the discharge end of the tube is received for a predetermined distance, a flexible portion of the skirt continuing rearwardly beyond said distance to the rear extremity of the skirt, the body further having a cup-form plug part disposed within the skirt in coaxial relation, the plug part having a forward stiff disc end wall normal to the axis of the skirt and a coned flexible wall extending rearwardly from the disc, the minor diameter end of the coned wall being merged into the periphery of the disc and its major diameter end having an out-turned connection continuous with the rear extremity of the skirt, the disc having a normal condition received in the discharge end of the tube in sealing relation to the internal wall of the latter, a plurality of slits cut through the connection part-way into both the flexible portion of the skirt and the coned wall, the open end of the cap having a stretch fit upon the tube and the coned wall normally having as a consequence a slightly inwardly tipped condition causing a compressive fluid-tight sealing relation of the walls of each slit upon one another, the disc adapted under pressure of air that may be exhausting through the tube to become dislodged axially rearward out of the tube so as to cause expansion of the flexible wall portions and consequent dilation of the several slits to open condition, the disc and flexible wall portions adapted upon cessation of exhaust flow to resiliently restore to normal condition, the slits in normal condition providing a seal against entrance of fluid and dust into the interior of the cap, and the disc providing in its normal position a secondary seal against entrance into the tube of foreign particles that might have gained entrance through the slits into the interior of the cap.

7. An exhaust cap engageable over the discharge end of an exhaust tube through which pressure gas is at times exhausted so as to allow exhaust of the gas, and so as to seal the tube against entry of foreign matter and moisture when pressure gas is not being exhausted, the cap comprising a one-piece elastic body having a tubular cylindrical wall open in its forward end and a tapering wall turned radially inward from the rear extremity of the cylindrical wall and extending forwardly into the interior of the cylindrical wall for a predetermined distance short of the forward end of the cylindrical wall, the tapering wall terminating at its forward end in a stiff disc coaxial with the cylindrical wall, the tapering wall and a rear portion of the cylindrical wall being continuous and flexible, and a plurality of slits cut through the extremity of the cylindrical wall and extending forwardly part-way into the flexible portion of the latter and part-way into the tapering wall, the slits having a normal fluid-tight closed condition, the open forward end of the cylindrical wall adapted to engage over the discharge end of an exhaust tube for a predetermined distance, the stiff disc adapted to be entered into the discharge end of the tube in sealing relation thereto upon such engagement of the cylindrical wall with the tube, and the stiff disc adapted under pressure of gas that may be exhausting through the tube to become dislodged axially rearward from the tube so as to cause expansion of the flexible wall portions and consequent dilation of the several slits to open condition.

References Cited

UNITED STATES PATENTS

| | | | |
|---|---|---|---|
| 2,829,380 | 4/1958 | Wood | 222—498 XR |
| 3,272,403 | 9/1966 | Alexander | 137—512.4 XR |
| 3,348,742 | 10/1967 | Assalit | 251—331 XR |
| 3,419,031 | 12/1968 | Hesse | 137—525 XR |

WILLIAM F. O'DEA, Primary Examiner

WILLIAM H. WRIGHT, Assistant Examiner

U.S. Cl. X.R.

137—525; 138—89; 220—44; 222—98